(12) United States Patent
Matas et al.

(10) Patent No.: US 9,774,693 B2
(45) Date of Patent: Sep. 26, 2017

(54) METHODS AND SYSTEMS FOR VIEWING USER FEEDBACK

(71) Applicant: Facebook, Inc., Menlo Park, CA (US)

(72) Inventors: Michael James Matas, Healdsburg, CA (US); Benjamin S. Langholz, San Francisco, CA (US); Brian Daniel Amerige, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 362 days.

(21) Appl. No.: 14/699,635

(22) Filed: Apr. 29, 2015

(65) Prior Publication Data
US 2016/0323395 A1 Nov. 3, 2016

(51) Int. Cl.
| G06F 3/00 | (2006.01) |
| H04L 29/08 | (2006.01) |
| G06F 3/0481 | (2013.01) |
| G06T 13/80 | (2011.01) |
| G06F 3/0484 | (2013.01) |
| G06F 3/0488 | (2013.01) |

(52) U.S. Cl.
CPC ......... H04L 67/22 (2013.01); G06F 3/04817 (2013.01); G06F 3/04842 (2013.01); G06F 3/04883 (2013.01); G06T 13/80 (2013.01); H04L 67/02 (2013.01)

(58) Field of Classification Search
CPC ...................................................... H04L 67/22
USPC ......................................................... 715/738
See application file for complete search history.

(56) References Cited

U.S. PATENT DOCUMENTS

| 8,832,560 B2* | 9/2014 | Yung ...................... G06Q 50/01 715/738 |
| 8,880,600 B2* | 11/2014 | Lento ..................... G06Q 10/10 455/435.1 |
| 8,887,035 B2* | 11/2014 | McDonald ............. G06Q 10/00 715/201 |
| 9,021,056 B2* | 4/2015 | Dunn ..................... G06Q 10/00 709/217 |
| 9,426,627 B1* | 8/2016 | Logan ................... H04W 4/028 |
| 2008/0201438 A1* | 8/2008 | Mandre ................... H04L 51/04 709/206 |
| 2009/0089162 A1* | 4/2009 | Davis ..................... G06Q 30/00 705/14.73 |
| 2009/0089294 A1* | 4/2009 | Davis ................. H04N 7/17318 |
| 2009/0089352 A1* | 4/2009 | Davis ..................... G06Q 10/00 709/201 |
| 2009/0148124 A1* | 6/2009 | Athsani .................. G06Q 30/02 386/241 |
| 2012/0137367 A1* | 5/2012 | Dupont ................... G06F 21/00 726/25 |
| 2012/0150970 A1* | 6/2012 | Peterson ............. G06F 3/04817 709/206 |

(Continued)

Primary Examiner — William Titcomb
(74) Attorney, Agent, or Firm — Morgan, Lewis & Bockius LLP

(57) ABSTRACT

In a client device having one or more processors and memory storing instructions for execution by the one or more processors, graphic icons of one or more users who have provided user feedback for a first content item are displayed. Each of the graphic icons is displayed in a respective region of a display area. The client device transitions from displaying one or more of the graphic icons to displaying, in the respective regions of the display area corresponding to the one or more of the graphic icons, user feedback for the first content item provided by respective users.

18 Claims, 13 Drawing Sheets

(56) References Cited

U.S. PATENT DOCUMENTS

| | | | | |
|---|---|---|---|---|
| 2013/0110978 A1* | 5/2013 | Gordon | H04N 21/2665 | 709/218 |
| 2013/0191458 A1* | 7/2013 | Krishnan | H04L 67/22 | 709/204 |
| 2013/0204664 A1* | 8/2013 | Romagnolo | G06Q 30/0203 | 705/7.32 |
| 2013/0275525 A1* | 10/2013 | Molina | H04L 51/10 | 709/206 |
| 2014/0101169 A1* | 4/2014 | Kurata | G06F 17/3087 | 707/748 |
| 2014/0208234 A1* | 7/2014 | Amit | G06Q 30/0273 | 715/753 |
| 2014/0250114 A1* | 9/2014 | Piantino | G06Q 50/01 | 707/725 |
| 2014/0372902 A1* | 12/2014 | Bryant | G06F 17/30029 | 715/748 |
| 2015/0052461 A1* | 2/2015 | Sullivan | G06F 3/04845 | 715/765 |
| 2015/0106429 A1* | 4/2015 | Hegberg | H04L 67/22 | 709/203 |
| 2015/0256499 A1* | 9/2015 | Kumar | H04L 51/28 | 709/206 |
| 2016/0021336 A1* | 1/2016 | Abbott | H04M 1/72572 | 348/14.02 |
| 2016/0057154 A1* | 2/2016 | Ferguson | H04L 63/104 | 726/7 |
| 2016/0132231 A1* | 5/2016 | Rathod | G06F 17/3074 | 715/719 |
| 2016/0132608 A1* | 5/2016 | Rathod | G06F 17/30867 | 707/722 |
| 2016/0253083 A1* | 9/2016 | Lee | G06F 3/04847 | 715/771 |
| 2016/0255139 A1* | 9/2016 | Rathod | H04L 67/10 | |
| 2016/0357418 A1* | 12/2016 | Rosenberg | E21B 47/122 | |

* cited by examiner

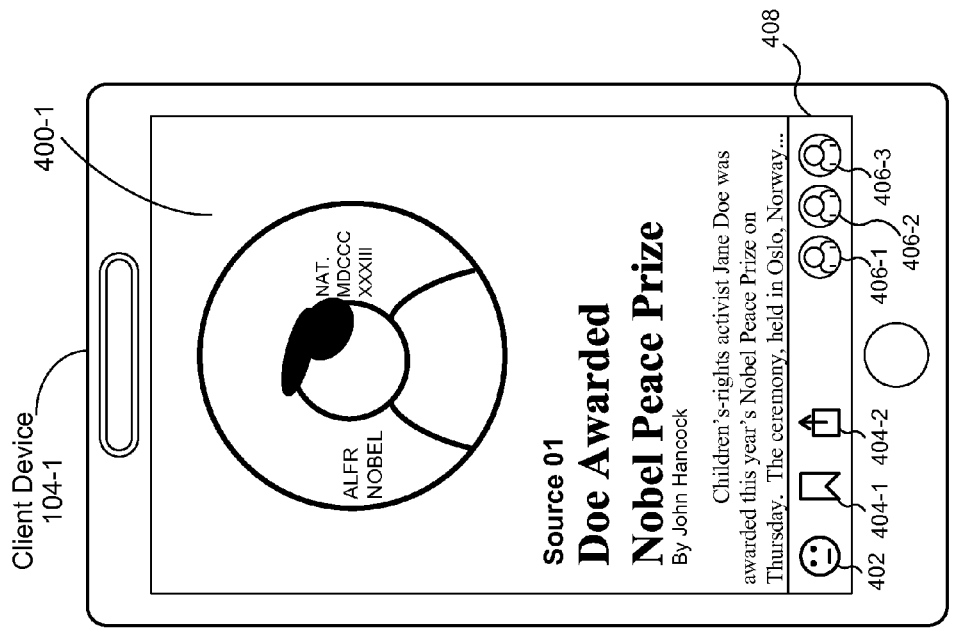

METHODS AND SYSTEMS FOR VIEWING USER FEEDBACK

TECHNICAL FIELD

This relates generally to viewing user feedback, including but not limited to transitioning from displaying graphic icons of users who have provided user feedback to displaying the respective user feedback.

BACKGROUND

The Internet has become an increasingly dominant platform for the publication of electronic content, for both the media and the general population. At the same time, enabling users to interact with such published electronic content has become an increasingly important feature for online services, such as social networks, to implement.

Given the abundance of user feedback provided by users who consume electronic content, users often struggle to view user feedback in an efficient manner.

SUMMARY

Accordingly, there is a need for methods, systems, and interfaces for viewing user feedback in a simple and efficient manner. By transitioning from displaying graphic icons of users who have provided user feedback for electronic content (e.g., "likes" for a news article) to displaying the corresponding user feedback, user feedback can be easily and quickly viewed. This transitioning may be performed in response to various triggers, such as touch gestures, in accordance with some embodiments. Such methods and interfaces optionally complement or replace conventional methods for viewing user feedback.

In accordance with some embodiments, a method is performed at a client device with one or more processors and memory storing instructions for execution by the one or more processors. The method includes displaying graphic icons of one or more users who have provided user feedback for a first content item. Each of the graphic icons is displayed in a respective region of a display area. The client device transitions from displaying one or more of the graphic icons to displaying, in the respective regions of the display area corresponding to the one or more of the graphic icons, user feedback for the first content item provided by respective users.

In accordance with some embodiments, a client device includes one or more processors, memory, and one or more programs; the one or more programs are stored in the memory and configured to be executed by the one or more processors. The one or more programs include instructions for performing the operations of the method described above. In accordance with some embodiments, a non-transitory computer-readable storage medium has stored therein instructions that, when executed by an electronic device such as the client device, cause the electronic device to perform the operations of the method described above.

Thus, client devices are provided with more effective and efficient methods for viewing user feedback, thereby increasing the effectiveness and efficiency of such devices and user satisfaction with such devices.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIGS. 4A-4J illustrate exemplary graphical user interfaces on a client device for viewing user feedback for content items, in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first content item could be termed a second content item, and, similarly, a second content item could be termed a first content item, without departing from the scope of the various described embodiments. The first content item and the second content item are both content items, but they are not the same content item.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
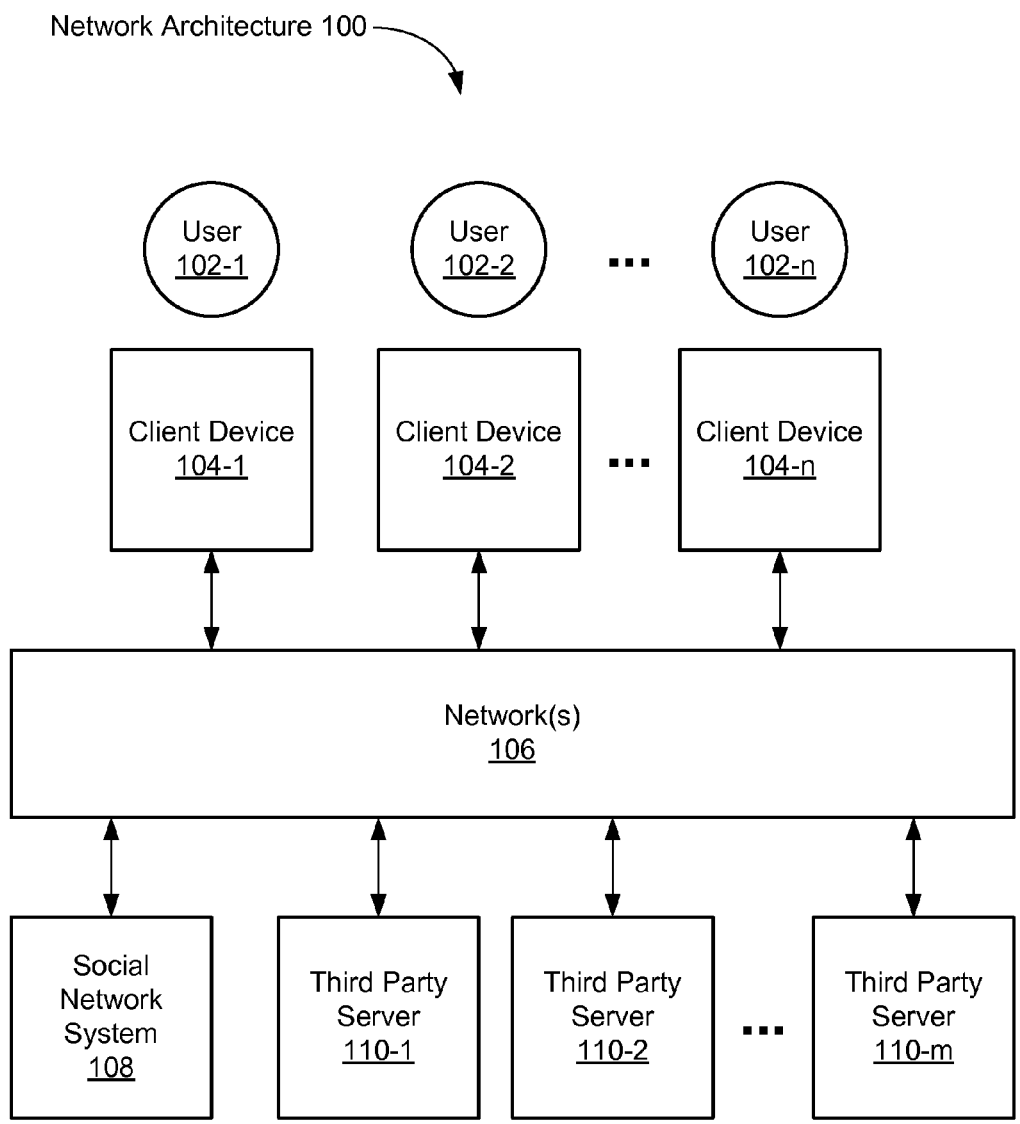
FIG. 1 is a block diagram illustrating an exemplary network architecture of a social network in accordance with some embodiments.

FIG. 1 is a block diagram illustrating an exemplary network architecture 100 of a social network in accordance with some embodiments. The network architecture 100 includes a number of client devices (also called "client systems," "client computers," or "clients") 104-1, 104-2, ... 104-n communicably connected to an electronic social-network system 108 by one or more networks 106 (e.g., the Internet, cellular telephone networks, mobile data networks, other wide area networks, local area networks, metropolitan area networks, and so on). In some embodiments, the one or more networks 106 include a public communication network (e.g., the Internet and/or a cellular data network), a private communications network (e.g., a private LAN or leased lines), or a combination of such communication networks.

In some embodiments, the client devices 104-1, 104-2, ... 104-n are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with the social-network system 108. In some embodiments, the social-network system 108 is a single computing device such as a computer server, while in other embodiments, the social-network system 108 is implemented by multiple computing devices working together to perform the actions of a server system (e.g., cloud computing).

Users 102-1, 102-2, ... 102-n employ the client devices 104-1, 104-2, ... 104-n to access the social-network system 108 and to participate in a corresponding social-networking service provided by the social-network system 108. For example, one or more of the client devices 104-1, 104-2, ... 104-n execute web browser applications that can be used to access the social-networking service. As another example, one or more of the client devices 104-1, 104-2, ... 104-n execute software applications that are specific to the social-networking service (e.g., social-networking "apps" running on smart phones or tablets, such as a Facebook social-networking application running on an iPhone, Android, or Windows smart phone or tablet).

Users interacting with the client devices 104-1, 104-2, ... 104-n can participate in the social-networking service provided by the social-network system 108 by posting information, such as text comments (e.g., updates, announcements, replies), digital photos, videos, audio files, links, and/or other electronic content. Users of the social-networking service can also annotate information posted by other users of the social-networking service (e.g., endorsing or "liking" a posting of another user, commenting on a posting by another user, or providing other feedback such as a facial expression on a posting by another user). In some embodiments, information can be posted on a user's behalf by systems and/or services external to the social-network system 108. For example, the user may post a review of a movie to a movie-review website, and with proper permissions that website may cross-post the review to the social network system 108 on the user's behalf. In another example, a software application executing on a mobile client device, with proper permissions, may use global positioning system (UPS) or other geo-location capabilities (e.g., Wi-Fi or hybrid positioning systems) to determine the user's location and update the social network system 108 with the user's location (e.g., "At Home", "At Work", or "In San Francisco, Calif."), and/or update the social network system 108 with information derived from and/or based on the user's location. Users interacting with the client devices 104-1, 104-2, ... 104-n can also use the social-networking service provided by the social-network system 108 to define groups of users. Users interacting with the client devices 104-1, 104-2, ... 104-n can also use the social-networking service provided by the social-network system 108 to communicate and collaborate with each other.

In some embodiments, the network architecture 100 also includes third-party servers 110-1, 110-2, ... 110-m. In some embodiments, a given third-party server 110 is used to host third-party websites that provide web pages to client devices 104, either directly or in conjunction with the social-network system 108. In some embodiments, the social-network system 108 uses inline frames ("iframes") to nest independent websites within a user's social network session. In some embodiments, a given third-party server is used to host third-party applications that are used by client devices 104, either directly or in conjunction with the social-network system 108. In some embodiments, the social-network system 108 uses iframes to enable third-party developers to create applications that are hosted separately by a third-party server 110, but operate within a social-networking session of a user 102 and are accessed through the user's profile in the social-network system 108. Exemplary third-party applications include applications for books, business, communication, contests, education, entertainment, fashion, finance, food and drink, games, health and fitness, lifestyle, local information, movies, television, music and audio, news, photos, video, productivity, reference material, security, shopping, sports, travel, utilities, and the like. In some embodiments, a given third-party server 110 is used to host enterprise systems, which are used by client devices 104, either directly or in conjunction with the social-network system 108. In some embodiments, a given third-party server 110 is used to provide third-party content (e.g., news articles, reviews, message feeds, etc.).

In some embodiments, a given third-party server 110 is a single computing device, while in other embodiments, a given third-party server 110 is implemented by multiple computing devices working together to perform the actions of a server system (e.g., cloud computing).

Figure 2:
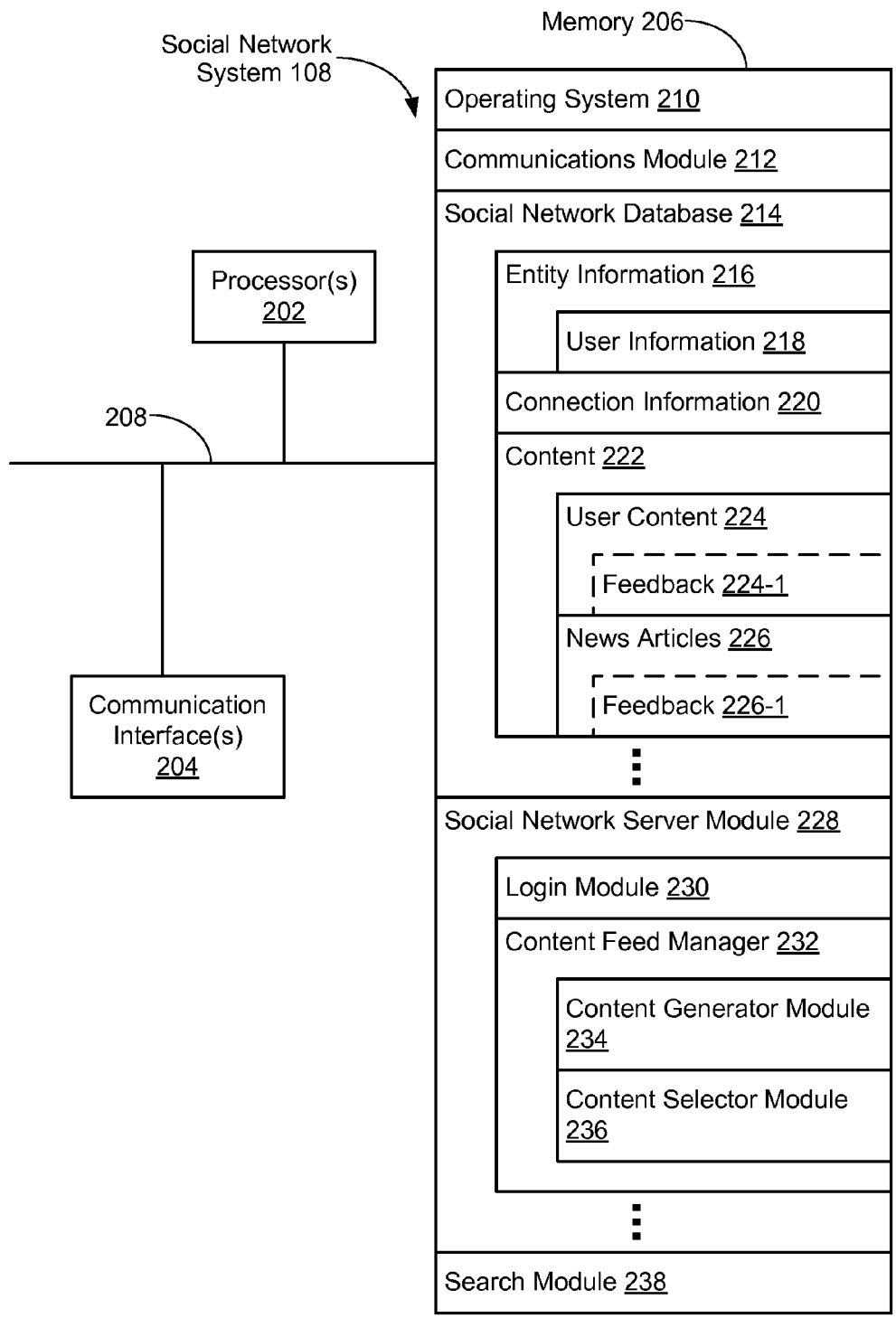
FIG. 2 is a block diagram illustrating an exemplary social-network system in accordance with some embodiments.

FIG. 2 is a block diagram illustrating an exemplary social-network system 108 in accordance with some embodiments. The social-network system 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The social-network system 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Figure 3:
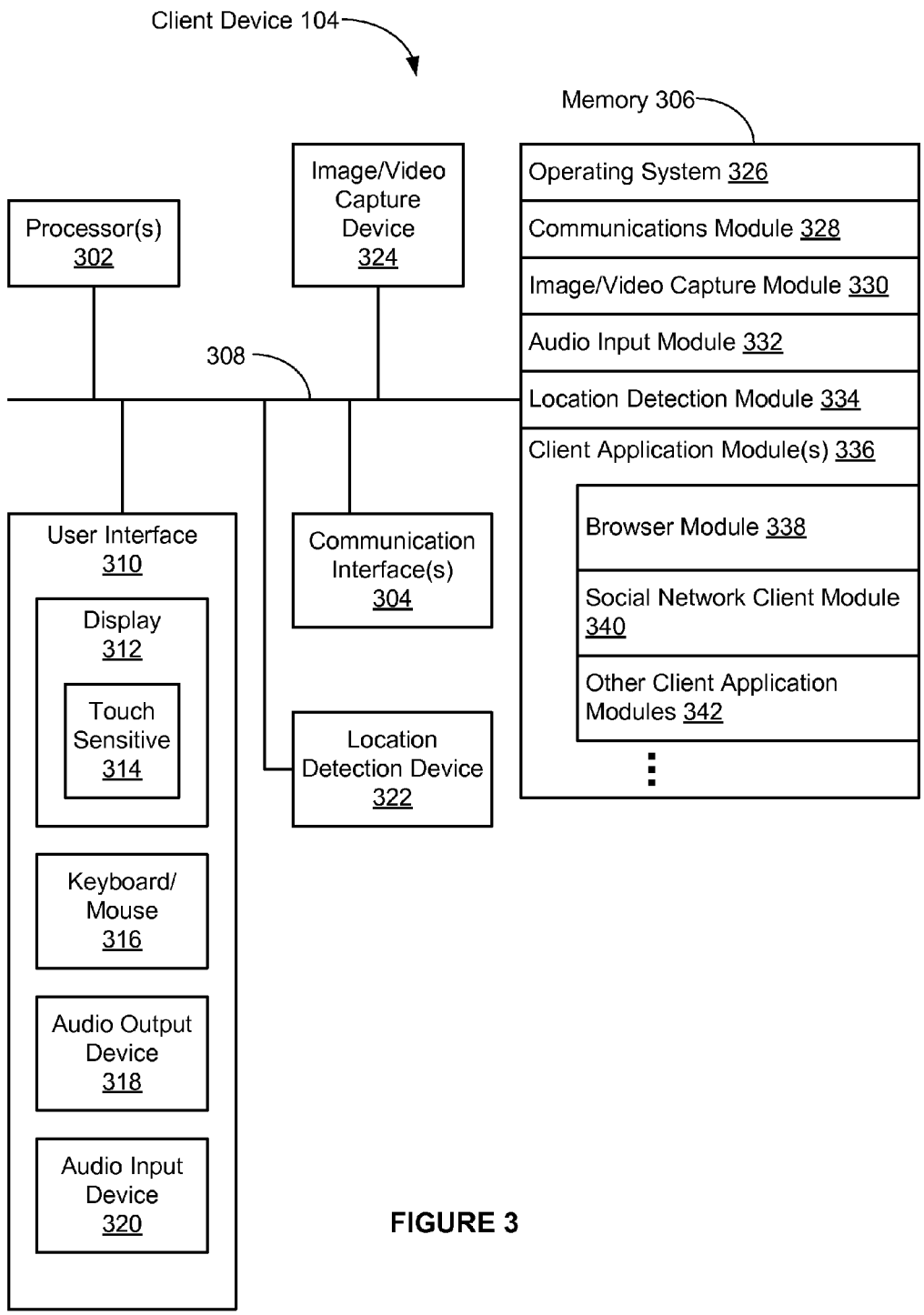
FIG. 3 is a block diagram illustrating an exemplary client device in accordance with some embodiments.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the social-network system 108 to other computers via the one or more communication network interfaces 204 (wired or wireless) and one or more communication networks (e.g., the one or more networks 106)
- a social network database 214 for storing data associated with the social network, such as:
  entity information 216, such as user information 218;
  connection information 220; and
  content 222, such as:
    user content 224, which includes user feedback 224-1 (e.g., "likes," comments, opinions having corresponding facial expressions and/or numerical index values, and/or other types of user feedback); and/or
    news articles 226, which includes user feedback 226-1 (e.g., "likes," comments, opinions having corresponding facial expressions and/or numerical index values, and/or other types of user feedback);
- a social network server module 228 for providing social-networking services and related features (e.g., in conjunction with browser module 338 or social network client module 340 on the client device 104, FIG. 3), which includes:
  a login module 230 for logging a user 102 at a client 104 into the social-network system 108; and
  a content feed manager 232 for providing content to be sent to clients 104 for display, which includes:
    a content generator module 234 for adding objects to the social network database 214, such as images, videos, audio files, comments, status messages, links, applications, and/or other entity information 216, connection information 220, or content 222; and
    a content selector module 236 for choosing the information/content to be sent to clients 104 for display; and
- a search module 238 for enabling users of the social-network system to search for content and other users in the social network.

The social network database 214 stores data associated with the social network in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social-networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, login information, privacy and other preferences, biographical data, and the like. In some embodiments, for a given user, the user information 218 includes the user's name, profile picture, contact information, birth date, sex, marital status, family status, employment, education background, preferences, interests, and/or other demographic information.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the social-network system 108 (e.g., in content 222) or on an external server, such as third-party server 110.

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social-network system 108 transmits a "friend request" to the second user. If the second user confirms the "friend request," the social-network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like," provide other feedback about, or have "attended," "played," "listened," "cooked," "worked at," or "watched" the entity at the other node. The page in the social-networking service that corresponds to the entity at the other node may include, for example, a selectable "like," "check in," or "add to favorites" icon, or other affordances for providing input such as user feedback. After the user selects one of these icons or other affordances, the social-network system 108 may create an edge (e.g., a "like" edge, "check in" edge, or a "favorites" edge) in response to the corresponding user action. As another example, the user may listen to a particular song using a particular application (e.g., an online music application). In this case, the social-network system 108 may create a "listened" edge and a "used" edge between the user node that corresponds to the user and the entity nodes that correspond to the song and the application, respectively, to indicate that the user listened to the song and used the application. In addition, the social-network system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., games executable within a browser window or frame), podcasts, links, and the like.

In some embodiments, the social network server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

FIG. 3 is a block diagram illustrating an exemplary client device 104 in accordance with some embodiments. The client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104. The client device 104 also optionally includes an image/video capture device 324, such as a camera or webcam.

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

an operating system 326 that includes procedures for handling various basic system services and for performing hardware dependent tasks;

a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;

an image/video capture module 330 (e.g., a camera module) for processing a respective image or video captured by the image/video capture device 324, where the respective image or video may be sent or streamed (e.g., by a client application module 336) to the social-network system 108;

an audio input module 332 (e.g., a microphone module) for processing audio captured by the audio input device 320, where the respective audio may be sent or streamed (e.g., by a client application module 336) to the social-network system 108;

a location detection module 334 (e.g., a GPS, Wi-Fi, or hybrid positioning module) for determining the location of the client device 104 (e.g., using the location detection device 322) and providing this location information for use in various applications (e.g., social network client module 340); and one or more client application modules 336, including the following modules (or sets of instructions), or a subset or superset thereof:

a web browser module 338 (e.g., Internet Explorer by Microsoft, Firefox by Mozilla, Safari by Apple, or Chrome by Google) for accessing, viewing, and interacting with web sites (e.g., a social-networking web site provided by the social-network system 108), a social network module 340 for providing an interface to a social-networking service (e.g., a social-networking service provided by social-network system 108) and related features; and/or other optional client application modules 342, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Attention is now directed towards embodiments of graphical user interfaces ("GUIs") and associated processes that may be implemented on a client device (e.g., the client device 104 in FIG. 3).

FIGS. 4A-4J illustrate exemplary GUIs on a client device 104 for viewing user feedback for content items, in accordance with some embodiments. The GUIs in these figures are used to illustrate the processes described below, including the methods 500 (FIG. 5A), 520 (FIG. 5B), 530 (FIG. 5C), and 550 (FIG. 5D). The GUIs may be provided by a web browser (e.g., web browser module 338, FIG. 3), an application for a social-networking service (e.g., social network module 340), and/or a third-party application (e.g., client application module 342). While FIGS. 4A-4J illustrate examples of GUIs, in other embodiments, a GUI displays user-interface elements in arrangements distinct from the embodiments of FIGS. 4A-4J.

FIG. 4A illustrates a GUI for a content item 400-1 (e.g., a news article), various affordances (e.g., user-feedback affordance 402 and optional affordances 404), a user-feedback interface ("UFI") 408, and icons 406 corresponding to users who have provided feedback for the content item 400-1.

FIGS. 4B-4J illustrate various GUIs displayed when a client device 104-1 transitions to displaying user feedback (e.g., in response to detecting user inputs).

Figure 4C:
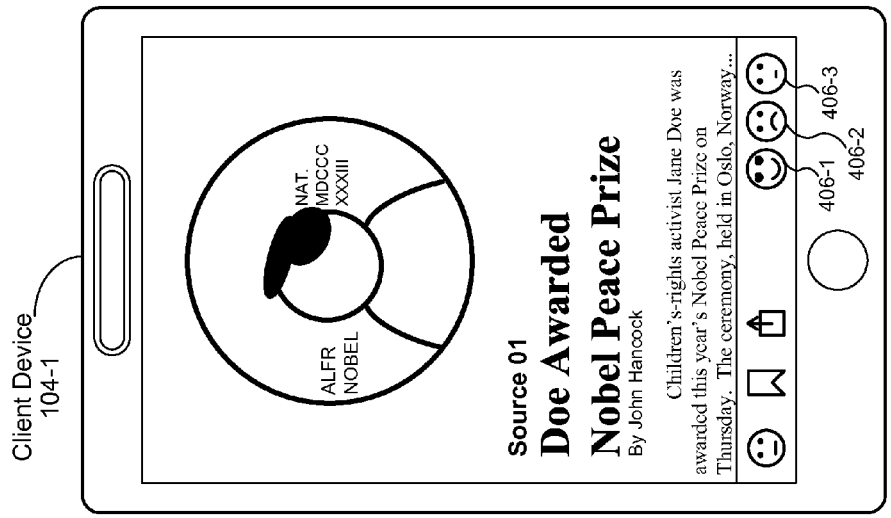
Figure 4B:
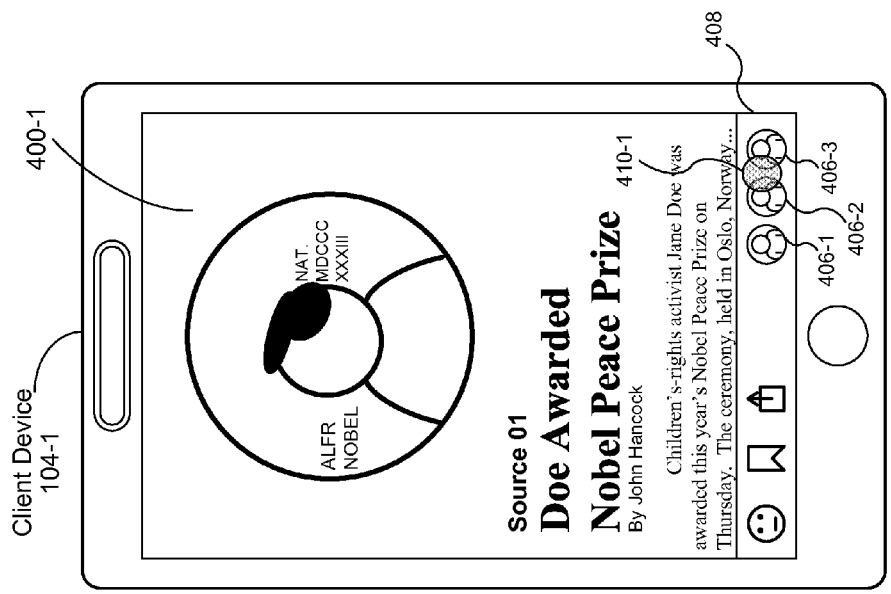
Figure 5A:
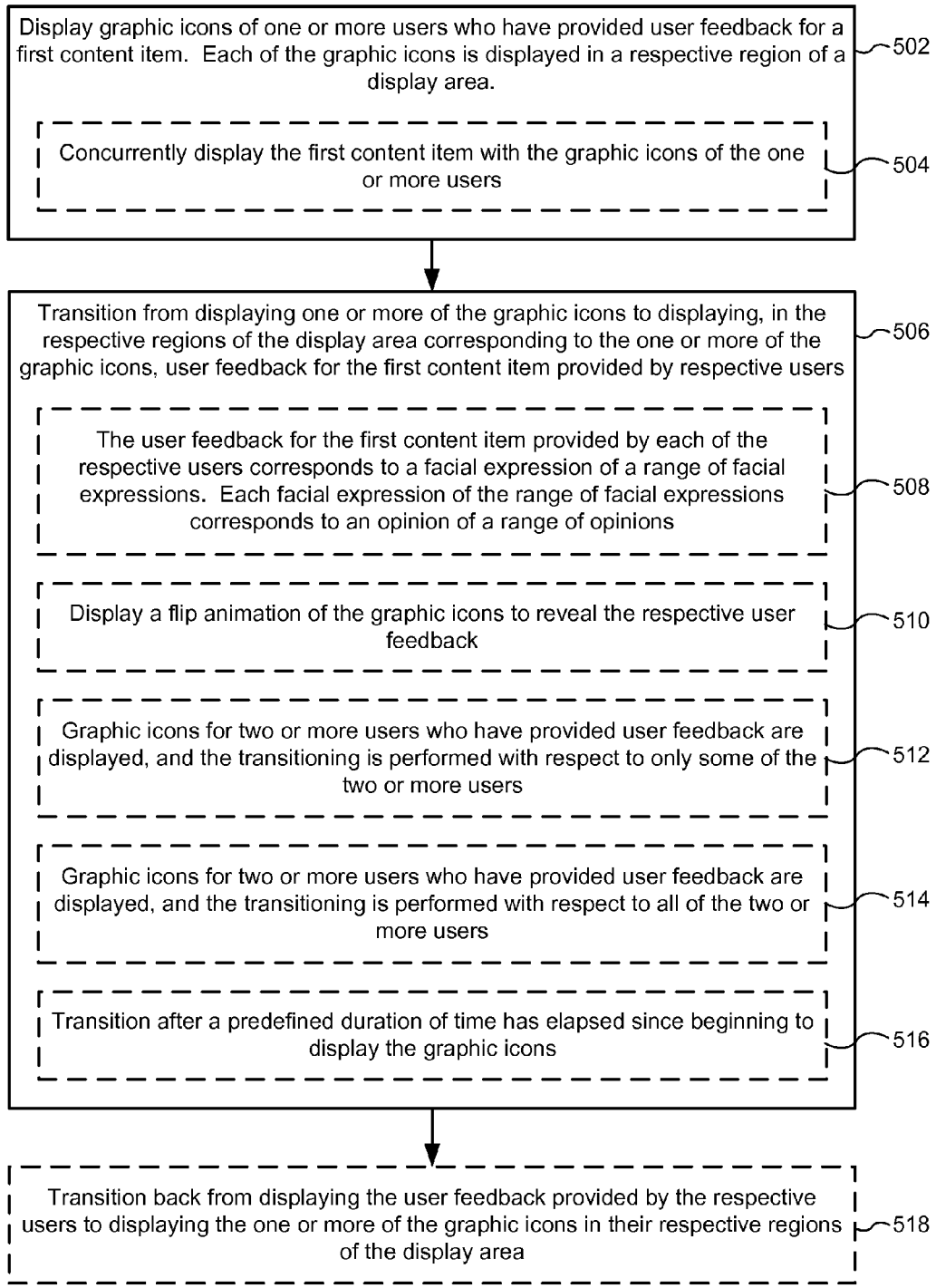
FIGS. 5A-5D are flow diagrams illustrating methods of viewing user feedback for content items, in accordance with some embodiments

For example, the touch gesture 410-1 in FIG. 4B (e.g., a tap) results in switching from displaying graphic icons of users who have provided user feedback for the content item 400-1 (e.g., icons 406 displaying user profile pictures), to displaying the user feedback itself in FIG. 4C (e.g., icons 406 displaying facial expressions corresponding to particular opinions of satisfaction/dissatisfaction and/or approval/disapproval). The icons 406 thus transition from providing indications (e.g., pictures) of respective users to showing feedback from the respective users. The icon 406-1 in FIG. 4C shows feedback from the user shown in the icon 406-1 in FIG. 4B, and likewise for icons 406-2 and 406-3. The feedback shown for each user thus is shown in the same location on the display as the graphic icon for that user, in accordance with some embodiments.

Figure 4E:
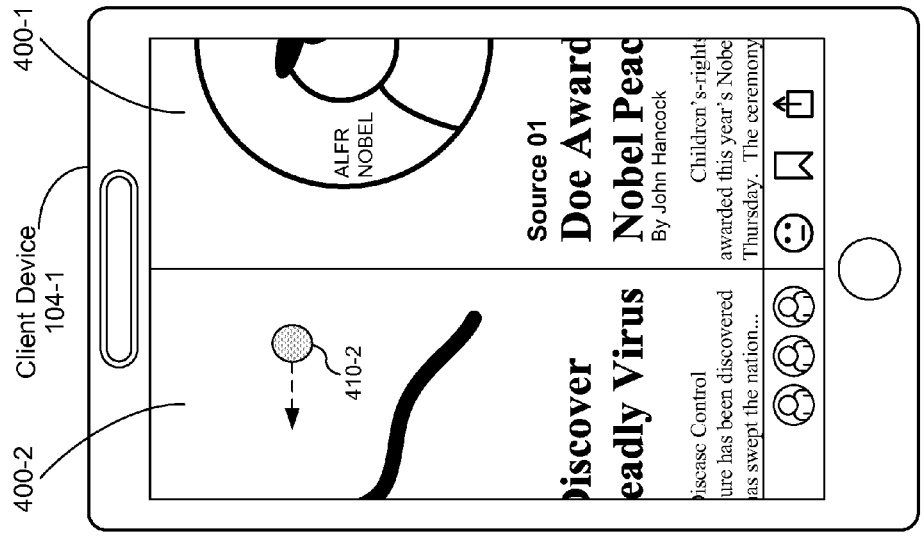
Figure 4D:
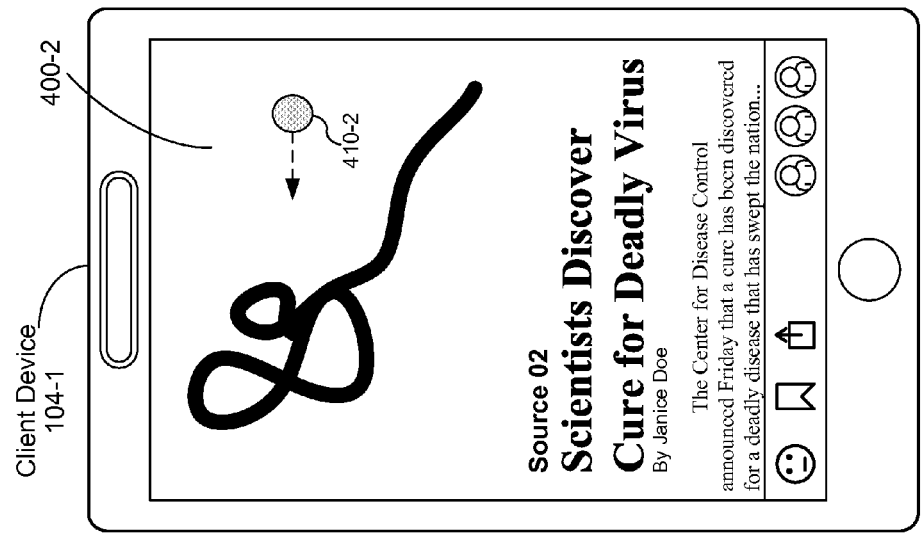
Figure 4F:
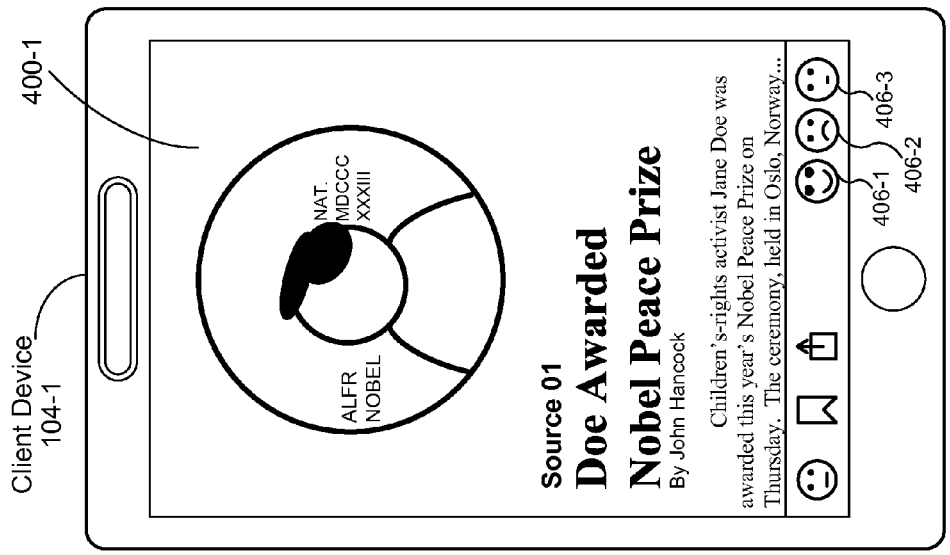
Figure 4G:
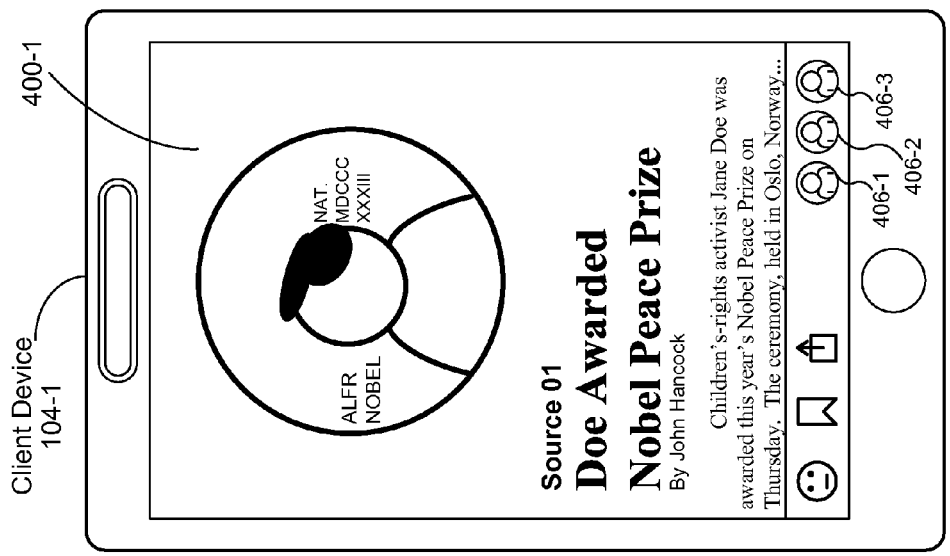

In another example, the touch gesture 410-2 in FIG. 4D (e.g., a swipe) results in switching from displaying a content item 400-2 to displaying a different content item 400-1, as shown in FIGS. 4E and 4F. After the transition from the content item 400-2 to the content item 400-1, the client device 104-1 switches from displaying the graphic icons of users who have provided user feedback for the content item 400-1 (e.g., icons 406 displaying user-profile pictures) to displaying the user feedback itself in FIG. 4G (e.g., icons 406 displaying facial expressions).

Figure 4I:
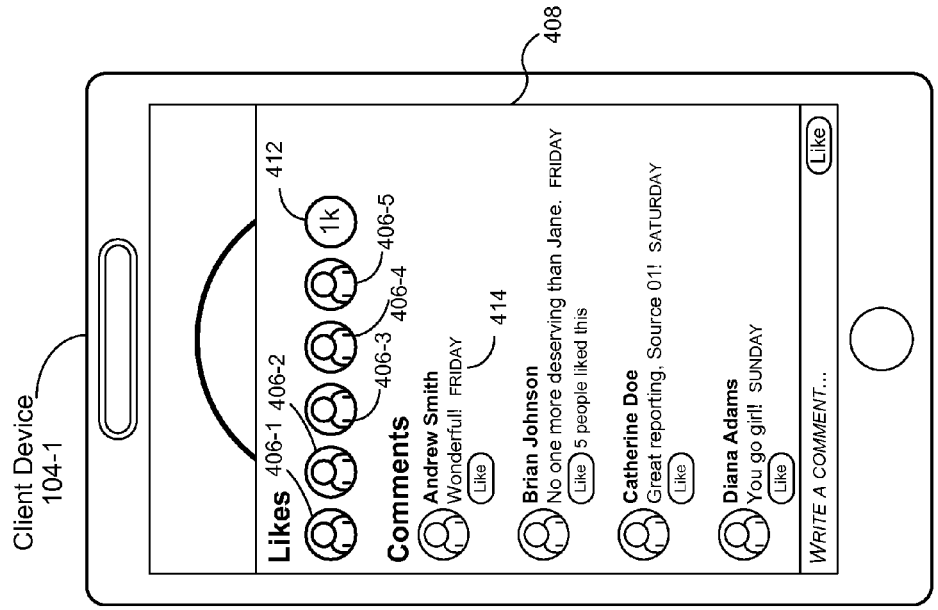
Figure 4H:
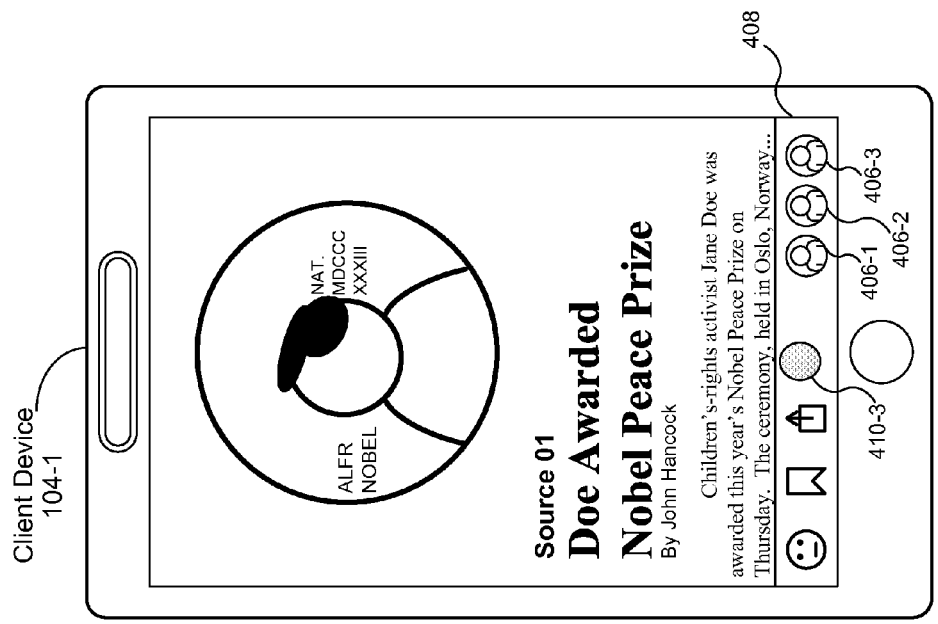

In another example, the touch gesture 410-3 in FIG. 4H (e.g., a tap) is detected on a compressed view of the UFI 408. In response, an expanded view of the UFI 408 is displayed in FIG. 4I, which includes graphic icons (e.g., icons 406 displaying user-profile pictures) of users who have provided user feedback for the content item 400-1. The expanded view of the UFI also displays other types of user feedback (e.g., comments 414) and an indicator 412 that identifies a number of other users who have also provided user feedback for the content item. Once the expanded view is displayed, the client device 104-1 switches from displaying the graphic icons of users to displaying the user feedback itself in FIG. 4J (e.g., icons 406 displaying facial expressions).

The GUIs shown in FIGS. 4A-4J are described in greater detail below in conjunction with the methods 500, 520, 530, and 550 of FIGS. 5A-5D.

FIGS. 5A-5D are flow diagrams illustrating methods 500 (FIG. 5A), 520 (FIG. 5B), 530 (FIG. 5C), and 550 (FIG. 5D) of viewing user feedback for content items, in accordance with some embodiments. The methods 500, 520, 530, and 550 are performed on a client device (e.g., client device 104, FIGS. 1 and 3) and correspond to instructions stored in a computer memory (e.g., memory 306 of the client device 104, FIG. 3) or other computer-readable storage medium. To assist with describing these methods, FIGS. 5A-5D will be described with reference to the exemplary GUIs illustrated in FIGS. 4A-4J.

The client device (e.g., client device 104-1, FIG. 4A) displays (502) graphic icons of one or more users who have provided user feedback for a first content item. Each of the graphic icons is displayed in a respective region of a display area. For example, in FIG. 4A, graphic icons (e.g., icons 406-1 through 406-3) of users who have provided user feedback for the content item 400-1 (e.g., a news article) are displayed. Each graphic icon is displayed in a particular region of the display area of the client device 104-1. In some implementations, the first content item is (504) concurrently displayed with the graphic icons of the one or more users (e.g., content item 400-1 are concurrently displayed with icons 406, FIG. 4A).

The client device transitions (506) from displaying one or more of the graphic icons to displaying, in the respective regions of the display area corresponding to the one or more of the graphic icons, user feedback for the first content item provided by respective users. FIGS. 4B and 4C illustrate an example, where the icons 406 transition from displaying graphic icons of the users in FIG. 4B to displaying the user feedback (e.g., facial expressions corresponding to opinions) of those users in FIG. 4C. As shown, the user feedback is displayed in the same regions of the display area in which the corresponding graphic icons are displayed.

User feedback for a content item (e.g., a news article) may include indications of endorsement (e.g., a "like," a share, a recommendation), commentary (e.g., snippets of comments), or other opinions (e.g., indications of satisfaction/dissatisfaction and/or approval/disapproval). In some embodiments, the user feedback for the first content item provided by each (or some) of the respective users corresponds (508) to a facial expression of a range of facial expressions. Each facial expression of the range of facial expressions corresponds to an opinion of a range of opinions. An example is illustrated in FIG. 4C, where the user feedback displayed by the icons 406 includes facial expressions that correspond to particular opinions (e.g., icon 406-1 corresponding to a facial expression of happiness, indicating an opinion of satisfaction/approval; feedback icon 406-2 corresponding to a facial expression of sadness, indicating an opinion of dissatisfaction/disapproval; and feedback icon 406-3 corresponding to a neutral facial expression, indicating an opinion of indifference). In some embodiments, the range of opinions varies from a first extreme to a second extreme (e.g., the first extreme represents an opinion of strong satisfaction/approval and the second extreme represents an opinion of strong dissatisfaction/disapproval). In some embodiments, the range of opinions includes a sequence of opinions, and each successive opinion of the sequence of opinions corresponds to a greater degree of satisfaction or dissatisfaction, or of approval or disapproval, than the preceding opinion (e.g., the range begins with an opinion with the greatest degree of satisfaction, and each successive opinion gradually decreases in its degree of satisfaction, or vice-versa).

In some embodiments, the transitioning (506) includes displaying (510) a flip animation of the graphic icons to reveal the respective user feedback (e.g., the icons 406 appear to flip). Alternatively, other visual effects may be executed (e.g., fade-in/fade-out, roll up/down or left/right, etc.).

In some embodiments, graphic icons for two or more users who have provided user feedback are (512) displayed, and the transitioning (506) is performed with respect to only some of the two or more users (e.g., only some of the graphic icons flip). In some embodiments, graphic icons for two or more users who have provided user feedback are (514) displayed, and the transitioning (506) is performed with respect to all of the two or more users (e.g., all graphic icons flip, as illustrated in FIGS. 4B and 4C).

In some embodiments, the transitioning (506) is performed (516) after a predefined duration of time has elapsed since beginning to display the graphic icons (e.g., after a specified number of seconds, for example 3 seconds). In some embodiments, the duration of time is measured from a time that the user begins to idle (e.g., no user input is detected after a specified number of seconds of viewing a content item). Other inputs or trigger conditions causing the transitioning (506) to be performed are described below with respect to FIGS. 5B-5D.

Optionally, the client device transitions (518) back from displaying the user feedback provided by the respective users to displaying the one or more of the graphic icons in their respective regions of the display area. For example, a transition occurs from FIG. 4C to FIG. 4B. Transitioning (518) back may be performed after a predefined duration of time has elapsed (e.g., after displaying user feedback for a specified number of seconds, for example 2 seconds) or in response to detecting other trigger conditions (e.g., detecting a touch gesture).

Figure 5B:
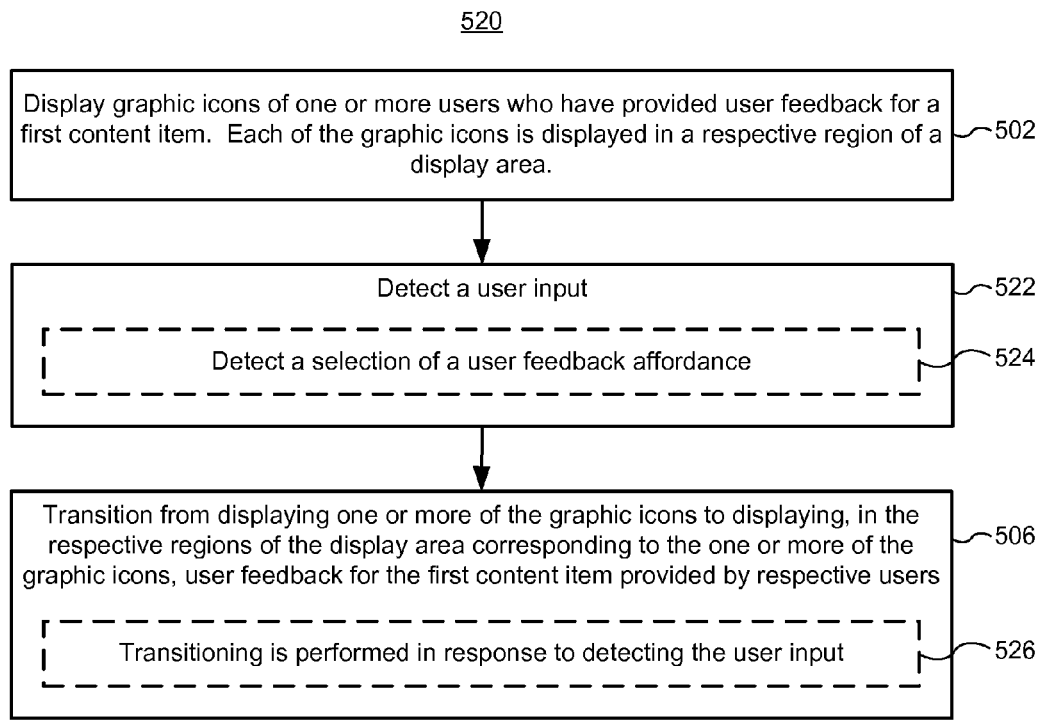

Referring now to FIG. 5B, in performing the method 520, the client device displays (502) graphic icons of one or more users who have provided user feedback for a first content item, as discussed above with respect to the method 500. Each of the graphic icons is displayed in a respective region of a display area.

A user input is (522) detected. In some embodiments, detecting the user input (522) includes detecting (524) a selection of a user feedback affordance (e.g., a touch gesture (not shown) is detected on the user-feedback affordance 402, FIG. 4A).

As described above with respect to the method 500, the client device transitions (506) from displaying one or more of the graphic icons to displaying, in the respective regions of the display area corresponding to the one or more of the graphic icons, user feedback for the first content item provided by respective users. The transitioning (506) is performed (526) in response to detecting the user input (at 522).

In one example, in response to the touch gesture 410-1 in FIG. 4B, the feedback icons 406 transition from displaying graphic icons of users who have provided user feedback for content item 400-1 to displaying the user feedback itself (e.g., facial expressions corresponding to respective opinions). In another example (not illustrated), this transition occurs in response to detecting a touch gesture on the user-feedback affordance 402 (FIG. 4A).

Figure 5C:
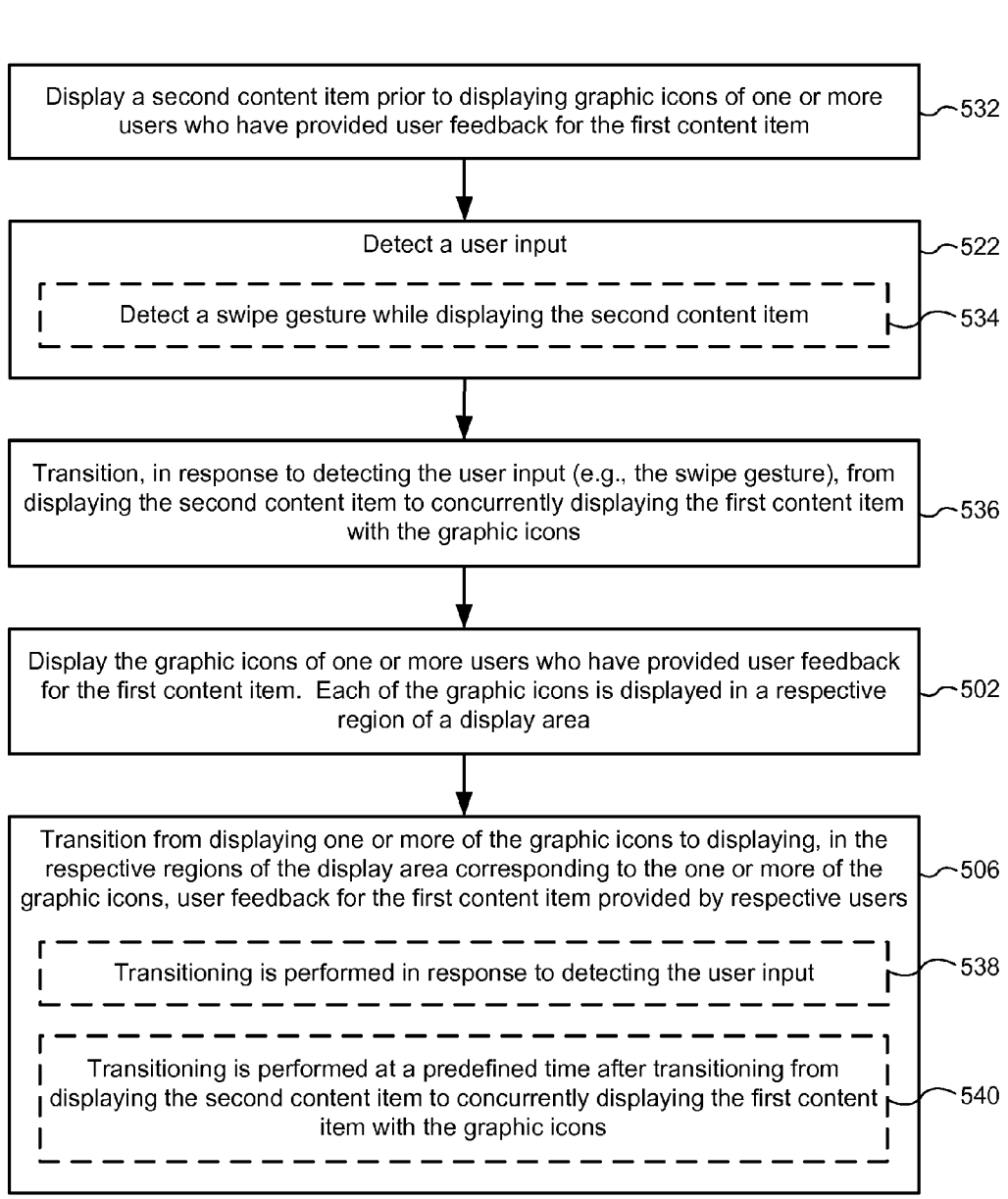
Figure 5D:
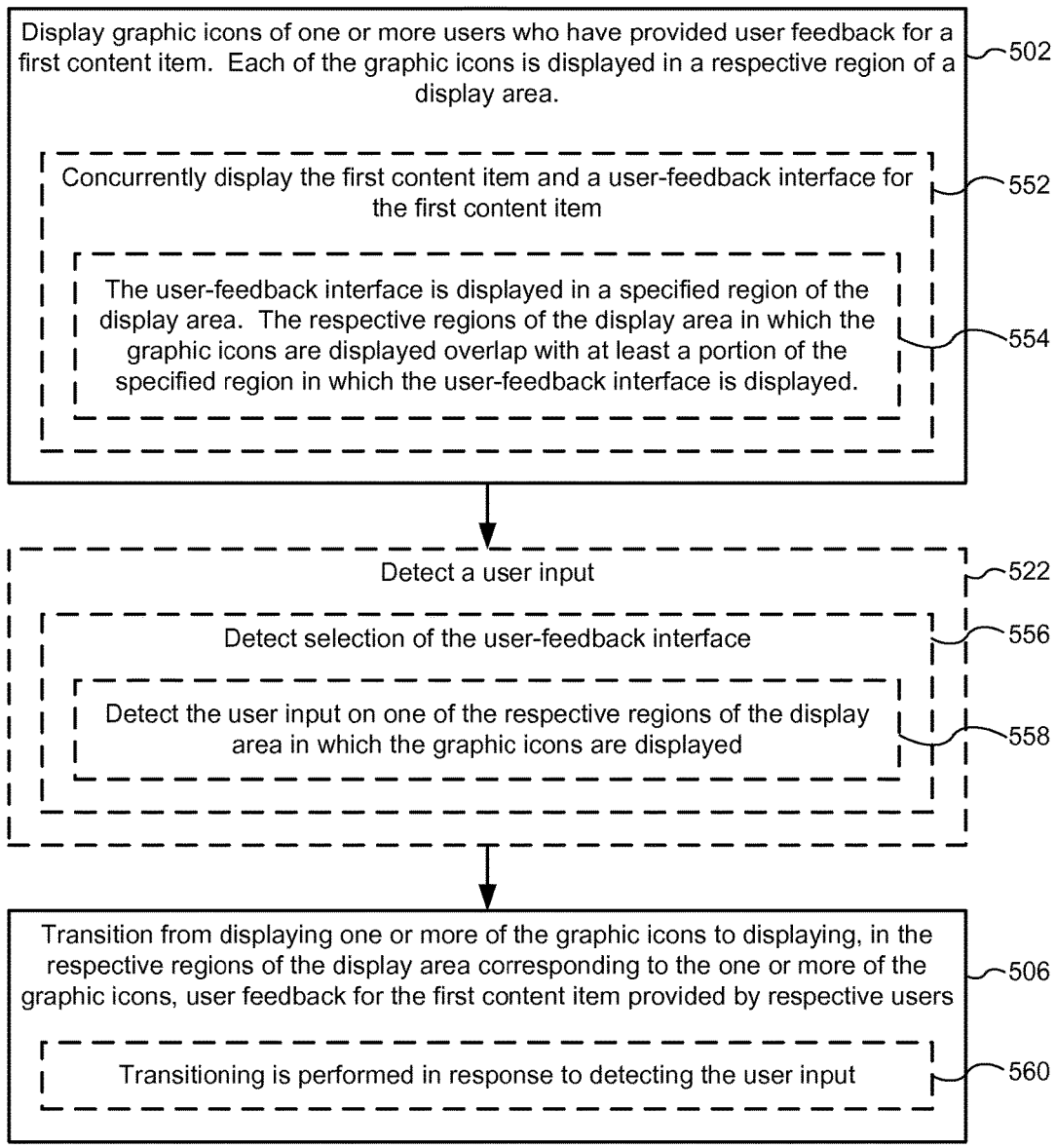

Referring now to FIG. 5C, in performing the method 530, the client device displays a second content item prior to displaying graphic icons of one or more users who have provided user feedback for the first content item. For example, in FIG. 4D, a second content item 400-2 is displayed.

A user input is (522) detected. In some embodiments, detecting the user input (522) includes detecting (534) a swipe gesture while displaying the second content item. For example, as shown in FIG. 4D, a touch gesture 410-2 (e.g., a swipe) is detected.

In response to detecting (522) the user input (e.g., the swipe gesture), the client device transitions (536) from displaying the second content item to concurrently displaying the first content item with the graphic icons. The graphic icons of one or more users who have provided user feedback for the first content item are displayed (502), as described above with respect to the method 500. Each of the graphic icons is displayed in a respective region of a display area. Continuing the example above, in response to detecting the touch gesture 410-2 (FIGS. 4D and 4E), the client device transitions from displaying the second content item 400-2 to displaying the first content item 400-1 concurrently with graphic icons of one or more users who have provided user feedback for the first content item (e.g., icons 406 displaying user-profile pictures, FIG. 4F).

As described above with respect to the method 500, the client device transitions (506) from displaying one or more of the graphic icons to displaying, in the respective regions of the display area corresponding to the one or more of the graphic icons, user feedback for the first content item provided by respective users. In some embodiments, the transitioning (506) is performed (538) in response to detecting the user input. For example, the touch gesture 410-2 (FIGS. 4D and 4E) for navigating between different content items is a trigger condition, the detection of which results in the client device transitioning from displaying graphic icons of users (e.g., feedback icons 406 in FIG. 4F) to displaying the corresponding user feedback of those users (e.g., feedback icons 406 in FIG. 4G, which display various facial expressions).

In some embodiments, the transitioning (506) is performed (540) at a predefined time after transitioning (536) from displaying the second content item to concurrently displaying the first content item with the graphic icons. In some embodiments, the predefined time is with respect to a time at which the transitioning (536) is initiated (e.g., a specified number of seconds after detecting the touch gesture 410-2, FIG. 4E). Thus, the transitioning (506) of displaying graphic icons to displaying the user feedback may be performed while the client device is still transitioning (536) from displaying the second content item to displaying the first content item (i.e., if the predefined time is shorter than the time to transition from one content item to another) or after the client device transitions from displaying the second content item to displaying the first content item (i.e., if the predefined time is shorter than the time to transition from one content item to another). In some embodiments, the predefined time is with respect to a time at which the transitioning (536) is completed (i.e., once the second content item is no longer displayed and the first content item is fully displayed).

Referring now to FIG. 5D, in performing the method 550, the client device displays (502) graphic icons of one or more users who have provided user feedback for a first content item, as discussed above with respect to the method 500. Each of the graphic icons is displayed in a respective region of a display area.

In some embodiments, the client device concurrently displays (552) the first content item and a user-feedback interface for the first content item. For example, in FIG. 4B, the content item 400-1 is displayed concurrently with the UFI 408. In some embodiments, the user-feedback interface is (554) displayed in a specified region of the display area. The respective regions of the display area in which the graphic icons are displayed overlap with at least a portion of the specified region in which the user-feedback interface is displayed (e.g., the graphic icons are within the user-feedback interface). Referring again to FIG. 4B, the UFI 408 is displayed in a region of the display area that overlaps with the region in which the feedback icons 406 are displayed.

In some embodiments, a user input is (522) detected. In some embodiments, detecting the user input (522) includes detecting (556) selection of the user-feedback interface. Detecting (556) selection of the user-feedback interface may include detecting (558) the user input on one of the respective regions of the display area in which the graphic icons are displayed. FIG. 4B illustrates an example, where a touch gesture 410-1 is detected on the region in which the feedback icons 406 are displayed.

As described above with respect to the method 500, the client device transitions (506) from displaying one or more of the graphic icons to displaying, in the respective regions of the display area corresponding to the one or more of the graphic icons, user feedback for the first content item provided by respective users. In some embodiments, the transitioning (506) is performed (560) in response to detecting the user input (at 522). For example, in response to detecting the touch gesture 410-1 on the region in which the feedback icons 406 are displayed (FIG. 4B), the client device 104-1 transitions from displaying the graphic icons of users (e.g., the feedback icons 406 in FIG. 4B) to displaying the user feedback of those users (e.g., the feedback icons 406 in FIG. 4C, which include facial expressions corresponding to respective opinions). In some embodiments, the client device transitions to displaying the respective user feedback of only the particular graphic icon on which the user input is detected (i.e., user feedback shown by tapping individual icons). In some embodiments, the client device transitions to displaying the respective user feedback for all graphic icons displayed, irrespective of the graphic icon on which the user input is detected (i.e., all graphic icons flip).

In some embodiments, an expanded view of the user-feedback interface is displayed in response to detecting (556) selection of the user-feedback interface. An example is illustrated in FIGS. 4H and 4I, where an expanded view of the UFI 408 (FIG. 4I) is displayed in response to detecting the touch gesture 410-3 on the compressed view of the UFI 408 (FIG. 4H). The respective locations in which graphic icons are displayed may be different in the expanded view than in the compressed view. As shown in FIG. 4I, the expanded view of the UFI 408 optionally includes additional graphic icons (e.g., feedback icons 406-4 and 406-5) of users who have provided user feedback for the first content item, which may be concurrently displayed with other types of user feedback (e.g., comments 414).

Figure 4J:
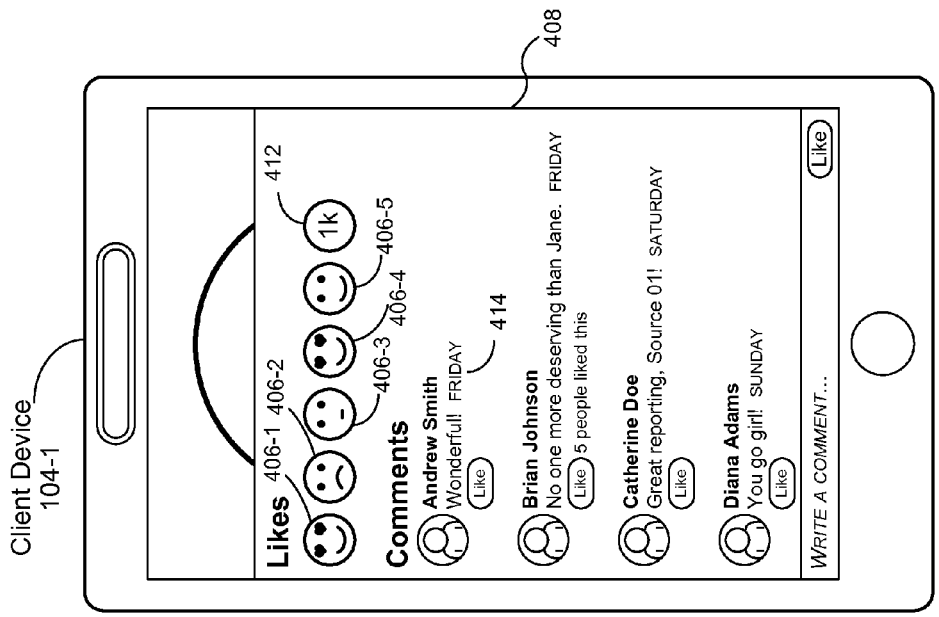

In some embodiments, displaying (502) the graphic icons of the one or more users and the transitioning (506) are performed while displaying the expanded view of the user-feedback interface. As shown in FIG. 4J, after the expanded view of the UFI 408 is displayed, the client device transitions from displaying graphic icons of users (e.g., icons 406 in FIG. 4I) to displaying the corresponding user feedback of those users (e.g., icons 406 in FIG. 4J, which display various facial expressions). In some embodiments, the client device concurrently displays comments for the first content item of one or more users (e.g., comments 414) and the user feedback for the first content item (e.g., icons 406). In some embodiments, transitioning (506) to displaying the user feedback is performed at a predefined time after detecting the selection of the UFI. Thus, the transitioning (506) may be performed while the client device is still transitioning to displaying the expanded view of the UFI (i.e., if the predefined time is shorter than the time to transition from displaying the compressed view of the UFI to displaying the expanded view of the UFI). In some embodiments, the transitioning (506) is performed after the expanded view of the UFI is fully displayed. For example, the transitioning (506) is performed at a predefined time after completion of the transitioning or at a predefined time after detecting the selection of the UFI that is longer than the time to transition from displaying the compressed view of the UFI to displaying the expanded view of the UFI.

Stages of methods 500, 520, 530, and 550 may be performed additionally and/or alternatively to one another. For example, transitioning (506) to displaying user feedback may be performed both in response to detecting (524, FIG. 5B) selection of a user-feedback affordance, and in response to detecting (534, FIG. 5C) a swipe gesture while displaying another content item.

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
at a client device having one or more processors and memory storing instructions for execution by the one or more processors:
displaying graphic icons of one or more users who have provided user feedback for a first content item, each of the graphic icons being displayed in a respective region of a display area; and
transitioning from displaying one or more of the graphic icons to displaying, in the respective regions of the display area corresponding to the one or more of the graphic icons, user feedback for the first content item provided by respective users.

2. The method of claim 1, wherein the transitioning comprises displaying a flip animation of the graphic icons to reveal the respective user feedback.

3. The method of claim 1, further comprising, after transitioning from displaying the one or more of the graphic icons to displaying the user feedback provided by the respective users, transitioning back from displaying the user feedback provided by the respective users to displaying the one or more of the graphic icons in their respective regions of the display area.

4. The method of claim 1, wherein the user feedback for the first content item provided by each of the respective users corresponds to a facial expression of a range of facial expressions, each facial expression of the range of facial expressions corresponding to an opinion of a range of opinions.

5. The method of claim 1, further comprising concurrently displaying comments for the first content item of one or more users and the user feedback for the first content item.

6. The method of claim 1, wherein:
displaying the graphic icons comprises displaying graphic icons for two or more users who have provided user feedback for the first content item; and
the transitioning is performed with respect to only some of the two or more users.

7. The method of claim 1, wherein:
displaying the graphic icons comprises displaying graphic icons for two or more users who have provided user feedback for the first content item; and
the transitioning is performed with respect to all of the two or more users.

8. The method of claim 1, further comprising detecting a user input, wherein the transitioning is performed in response to detecting the user input.

9. The method of claim 8, wherein detecting the user input comprises detecting a selection of a user feedback affordance.

10. The method of claim 8, further comprising displaying a second content item prior to displaying graphic icons of one or more users who have provided user feedback for the first content item,
wherein detecting the user input comprises detecting a swipe gesture while displaying the second content item.

11. The method of claim 10, further comprising:
transitioning, in response to detecting the swipe gesture, from displaying the second content item to concurrently displaying the first content item with the graphic icons;
wherein transitioning from displaying the one or more of the graphic icons to displaying the user feedback is performed at a predefined time after transitioning from displaying the second content item to concurrently displaying the first content item with the graphic icons.

12. The method of claim 8, further comprising concurrently displaying the first content item and a user-feedback interface for the first content item;
wherein detecting the user input comprises detecting selection of the user-feedback interface.

13. The method of claim 12, wherein:
the user-feedback interface is displayed in a specified region of the display area;
the respective regions of the display area in which the graphic icons are displayed overlap with at least a portion of the specified region in which the user-feedback interface is displayed; and
selection of the user-feedback interface comprises detecting the user input on one of the respective regions of the display area in which the graphic icons are displayed.

14. The method of claim 12, further comprising displaying an expanded view of the user-feedback interface in response to detecting selection of the user-feedback interface,
wherein displaying the graphic icons of the one or more users and the transitioning are performed while displaying the expanded view of the user-feedback interface.

15. The method of claim 1, further comprising concurrently displaying the first content item with the graphic icons of the one or more users.

16. The method of claim 15, wherein the transitioning is performed after a predefined duration of time has elapsed since beginning to display the graphic icons.

17. A client device, comprising:
one or more processors; and
memory storing one or more programs for execution by the one or more processors, the one or more programs including instructions for:
displaying graphic icons of one or more users who have provided user feedback for a first content item, each of the graphic icons being displayed in a respective region of a display area; and
transitioning from displaying one or more of the graphic icons to displaying, in the respective regions of the display area corresponding to the one or more of the graphic icons, user feedback for the first content item provided by respective users.

18. A non-transitory computer-readable storage medium storing one or more programs for execution by one or more processors of a client device, the one or more programs including instructions for:
displaying graphic icons of one or more users who have provided user feedback for a first content item, each of the graphic icons being displayed in a respective region of a display area; and
transitioning from displaying one or more of the graphic icons to displaying, in the respective regions of the display area corresponding to the one or more of the graphic icons, user feedback for the first content item provided by respective users.

* * * * *